(12) United States Patent
Yamada

(10) Patent No.: US 11,055,132 B2
(45) Date of Patent: Jul. 6, 2021

(54) MULTICORE PAGE FAULT PROCESSING

(71) Applicant: NEC Corporation, Tokyo (JP)

(72) Inventor: Yohei Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 20 days.

(21) Appl. No.: 16/361,336

(22) Filed: Mar. 22, 2019

(65) Prior Publication Data
US 2019/0294467 A1    Sep. 26, 2019

(30) Foreign Application Priority Data

Mar. 26, 2018 (JP) ................. 2018-058317

(51) Int. Cl.
*G06F 9/48* (2006.01)
*G06F 9/54* (2006.01)
*G06F 12/1009* (2016.01)

(52) U.S. Cl.
CPC .............. *G06F 9/485* (2013.01); *G06F 9/542* (2013.01); *G06F 12/1009* (2013.01)

(58) Field of Classification Search
CPC .. G06F 9/485; G06F 12/1009; G06F 9/30036; G06F 9/3861; G06F 12/08; G06F 9/542
See application file for complete search history.

(56) References Cited

U.S. PATENT DOCUMENTS

| 2007/0214340 A1* | 9/2007 | Leveille | ............... | G06F 12/1483 |
| | | | | 711/203 |
| 2010/0049960 A1* | 2/2010 | Okamoto | ............... | G06F 9/4401 |
| | | | | 713/1 |
| 2012/0314576 A1 | 12/2012 | Hasegawa et al. | | |
| 2013/0290771 A1* | 10/2013 | Kim | ..................... | G06F 11/2023 |
| | | | | 714/3 |
| 2014/0304559 A1* | 10/2014 | Ginzburg | ............ | G06F 9/30036 |
| | | | | 714/57 |

(Continued)

FOREIGN PATENT DOCUMENTS

| JP | H02-234268 A | 9/1990 |
| JP | H04-52759 A | 2/1992 |
| WO | 2011/102294 A1 | 8/2011 |

OTHER PUBLICATIONS

Japanese Office Action for JP Application No. 2018-058317 dated Mar. 5, 2019 with English Translation.

*Primary Examiner* — Benjamin C Wu
(74) *Attorney, Agent, or Firm* — Sughrue Mion, PLLC

(57) ABSTRACT

A first processor core with an operating system installed and a second processor core controlled by the first processor core and capable of executing parallel operation processing are included. The second processor core, when detecting a page fault, stops new instruction issue and stops as an issued and uncompleted instruction can be restarted, and also sends notification of page fault detection to the first processor core. The first processor core includes a permissibility judgment part that judges whether or not the page fault is permissible in response to reception of the notification, a page table updating part that updates a page table included by the second processor core in accordance with a result of the judgment by the permissibility judgment part, and a directing part that sends a direction corresponding to a result of the judgment by the permissibility judgment part to the second processor core.

10 Claims, 8 Drawing Sheets

(56) References Cited

U.S. PATENT DOCUMENTS

2017/0277537 A1* 9/2017 Grocutt .............. G06F 9/30036
2017/0315806 A1* 11/2017 Mazumdar .......... G06F 9/30094
2018/0107605 A1* 4/2018 Dong ................. G06F 9/45558
2019/0042461 A1* 2/2019 Vakharwala .......... G06F 3/0614
2020/0249976 A1* 8/2020 Tateno ................ G06F 9/45558

* cited by examiner

MULTICORE PAGE FAULT PROCESSING

INCORPORATION BY REFERENCE

This application is based upon and claims the benefit of priority from Japanese patent application No. 2018-058317, filed on Mar. 26, 2018, the disclosure of which is incorporated herein in its entirety by reference.

TECHNICAL FIELD

The present invention relates to an information processing device, an information processing method, and a non-transitory computer-readable recording medium for recording a program.

BACKGROUND ART

A processor is known which can perform a parallel operation or a large-scale operation such as a vector operation that is simultaneously applying an instruction to a plurality of pieces of data and performing parallel processing.

For example, a technique relating to an arithmetic device which performs parallel processing as described above is available in Patent Document 1. Patent Document 1 describes a processor having an arithmetic execution unit configured to, upon detecting occurrence of an exception during execution of a single instruction, distribute a pending trap or interrupt to an exception handler before delivering an exception.

Patent Document 1: International Publication WO 2011/102294

In the processor performing a parallel operation or a large-scale operation as described above, if it is attempted to implement a restartable page fault, it is required to, until it is determined for each of all instructions accessing a memory whether or not the instruction causes a page fault, suspend execution of a subsequent instruction or execute a subsequent instruction in a state where the subsequent instruction can be canceled. However, in the case of the processor performing a parallel operation or a large-scale operation, the size of data handled by one vector instruction is large. Therefore, there has been a problem that, in order to execute an instruction in a state where the instruction can be canceled, it is necessary to hold transient information of a large size.

Further, in order to increase the execution efficiency of the processor performing a vector operation that is parallel processing, it is necessary to execute many instructions ahead of time. Therefore, the number of issued and uncompleted instructions (the number of inflight instructions) at a certain point of time tends to increase. As a result, in the processor performing a vector operation, there is a possibility that the number of subsequent instructions that must be executed in a state where the instructions can be canceled increases by the time it is determined whether or not a page fault of a certain instruction has occurred. From this point of view, there has also been a problem that the size of data that must be held in a transient state increases.

Further, the problem as described above is especially remarkable in executing a vector gather/scatter instruction, which is executed in a vector processor. This is because in the vector gather/scatter instruction, a timing at which a page fault is found is delayed.

For the reasons as described above, some processors have difficulty being provided with restartable page faults. In the case of such a processor, it is possible to detect, but impossible to restart a page fault such as unallocated page access and unauthorized access, so that there is no choice other than exiting a process having caused a page fault as it is.

SUMMARY OF THE INVENTION

Accordingly, an object of the present invention is to provide an information processing device, an information processing method, and a non-transitory computer-readable recording medium for recording a program which solve the problem that some processors have difficulty realizing a restartable page fault.

In order to achieve the object, an information processing device as an aspect of the present invention has a first processor core in which an operating system is installed and a second processor core controlled by the first processor core and capable of executing parallel operation processing. The second processor core is configured to, when detecting a page fault, stop new issue of an instruction and stop in a state where an issued and uncompleted instruction can be restarted, and also send notification that the page fault has been detected to the first processor core. The first processor core includes a permissibility judgment part configured to judge whether or not the page fault is permissible in response to reception of the notification, a page table updating part configured to update a page table included by the second processor core in accordance with a result of the judgment by the permissibility judgment part, and a directing part configured to send a direction corresponding to a result of the judgment by the permissibility judgment part to the second processor core.

Further, an information processing method as another aspect of the present invention is an information processing method executed by an information processing device having a first processor core in which an operating system is installed and a second processor core controlled by the first processor core and capable of executing parallel operation processing. The information processing method includes, by the second processor core, when detecting the page fault, stopping new issue of an instruction and stopping in a state where an issued and uncompleted instruction can be restarted, and also sending notification that the page fault has been detected to the first processor core. The information processing method also includes, by the first processor core, judging whether or not the page fault is permissible in response to reception of the notification, updating a page table included by the second processor core in accordance with a result of the judgment, and sending a direction corresponding to a result of the judgment to the second processor core.

Further, a non-transitory computer-readable recording medium for recording a program as another aspect of the present invention is a non-transitory computer-readable medium storing a program including instructions for, in an information processing device having a first processor core in which an operating system is installed and a second processor core controlled by the first processor core and capable of executing parallel operation processing: causing the second processor core to realize a process of, when detecting the page fault, stopping new issue of an instruction and stopping in a state where an issued and uncompleted instruction can be restarted, and also sending notification that the page fault is detected to the first processor core; and causing the first processor core to realize a permissibility judgment part configured to, in response to reception of the notification, judge whether or not the page fault is permissible, a page table updating part configured to update a page table included by the second processor core in accordance with a result of the judgment by the permissibility judgment part, and an directing part configured to send a direction corresponding to a result of the judgment by the permissibility judgment part to the second processor core.

Configured as described above, the present invention can provide an information processing device, an information processing method, and a non-transitory computer-readable recording medium for recording a program which solve the problem that some processors have difficulty realizing a restartable page fault.

EXAMPLE EMBODIMENT

First Example Embodiment

Figure 1:
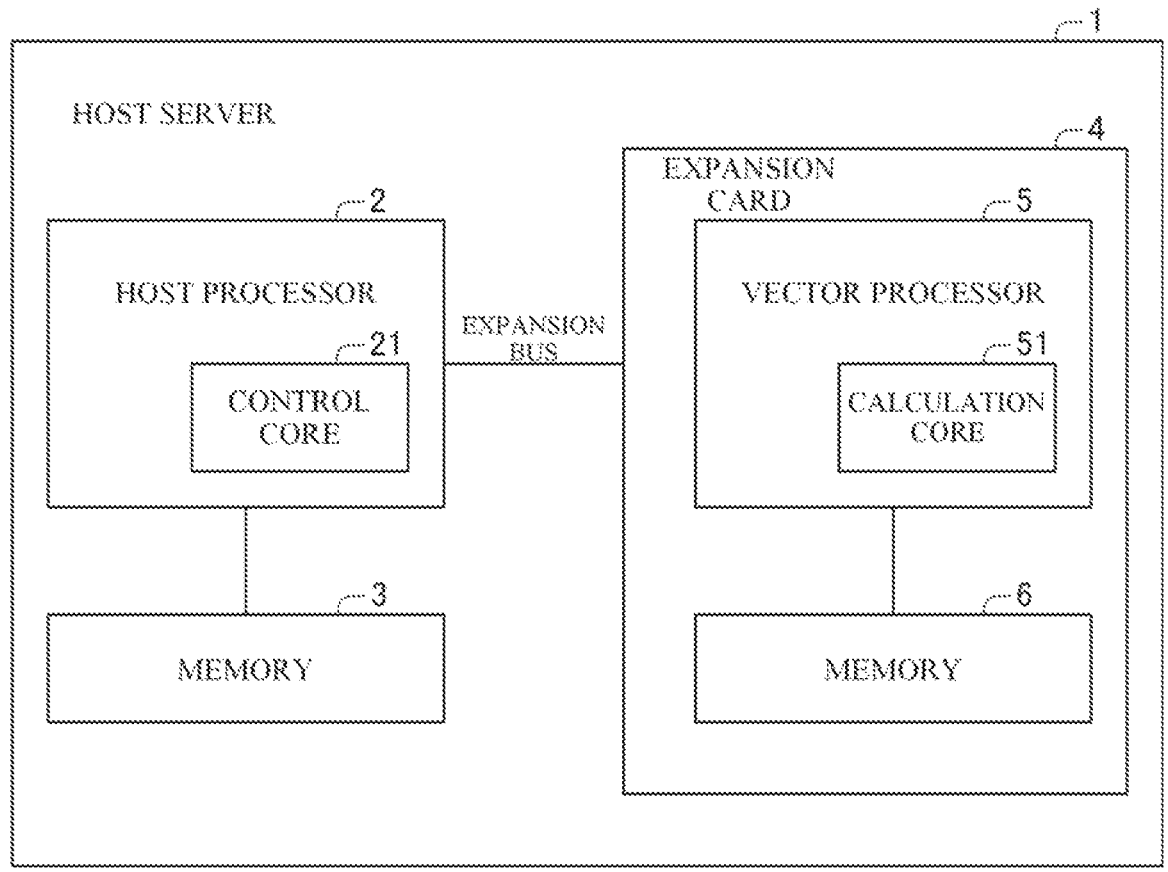
FIG. 1 is a block diagram showing an example of the configuration of a host server according to a first example embodiment of the present invention.
Figure 2:
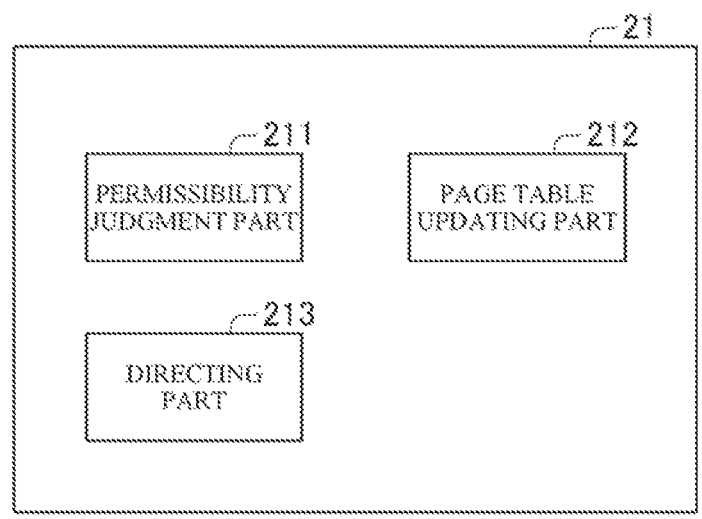
FIG. 2 is a block diagram showing an example of the function of a control core shown in FIG. 1.
Figure 3:
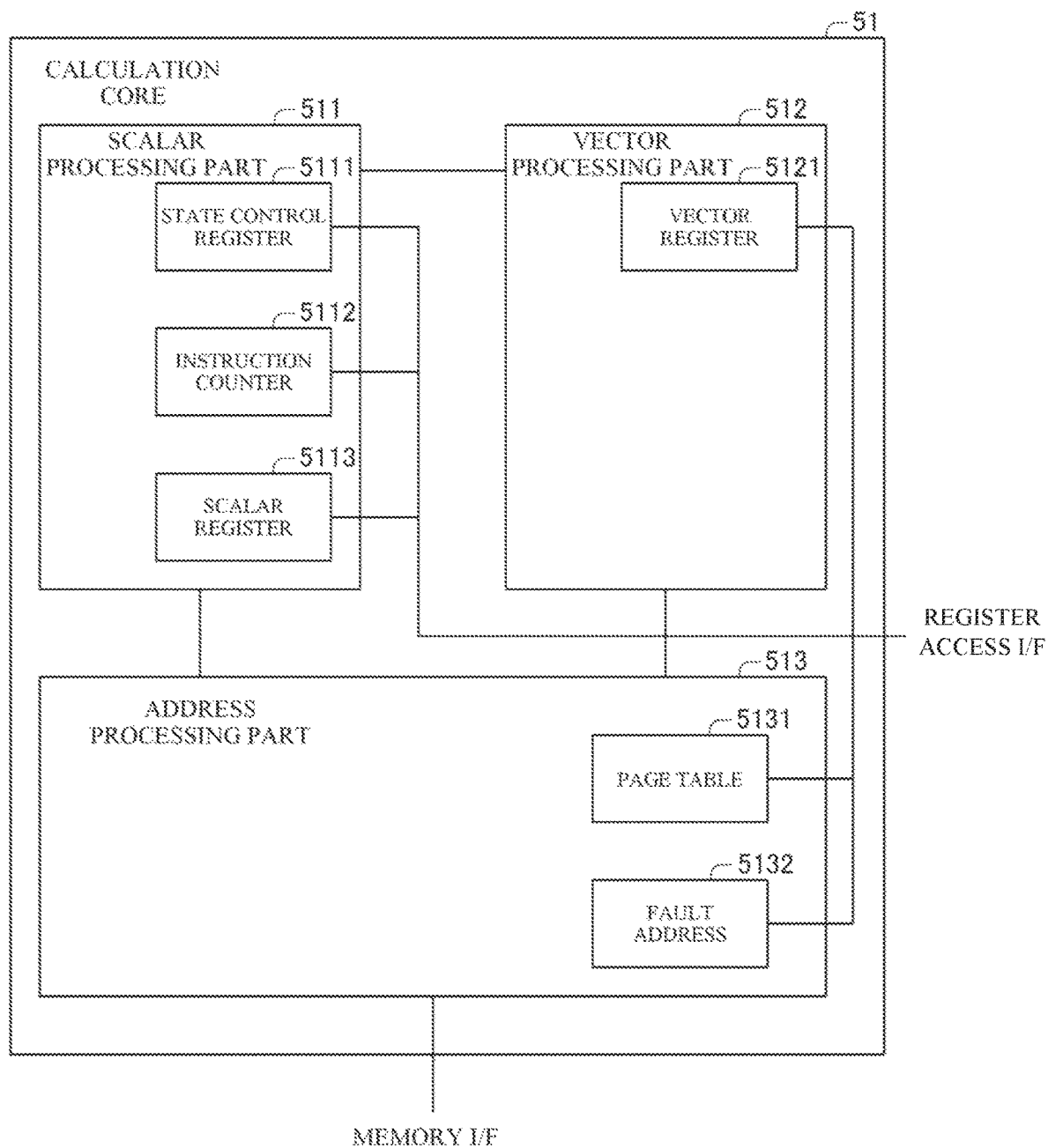
FIG. 3 is a block diagram showing an example of the configuration of a calculation core shown in FIG. 1.
Figure 4:
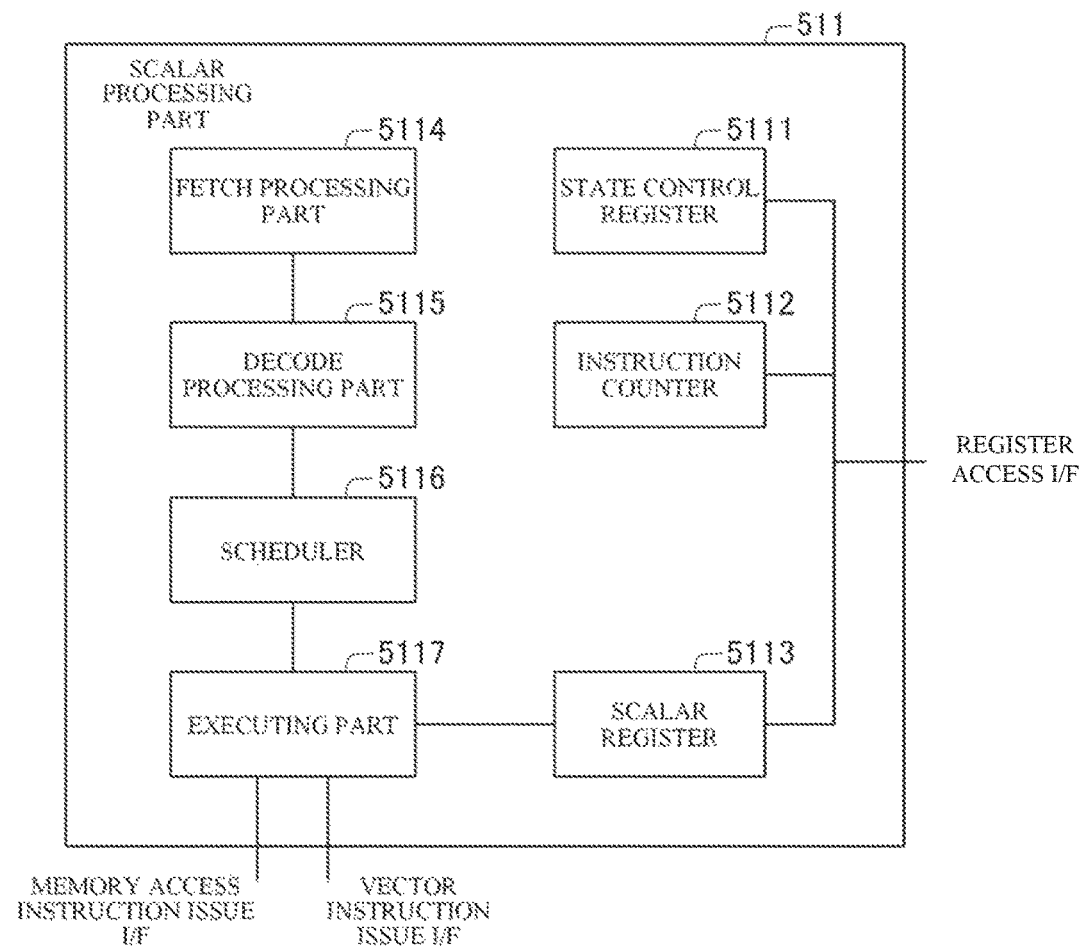
FIG. 4 is a block diagram showing an example of the configuration of a scalar processing part shown in FIG. 3.
Figure 5:
FIG. 5 is a view for describing a state control register shown in FIG. 4.
Figure 6:
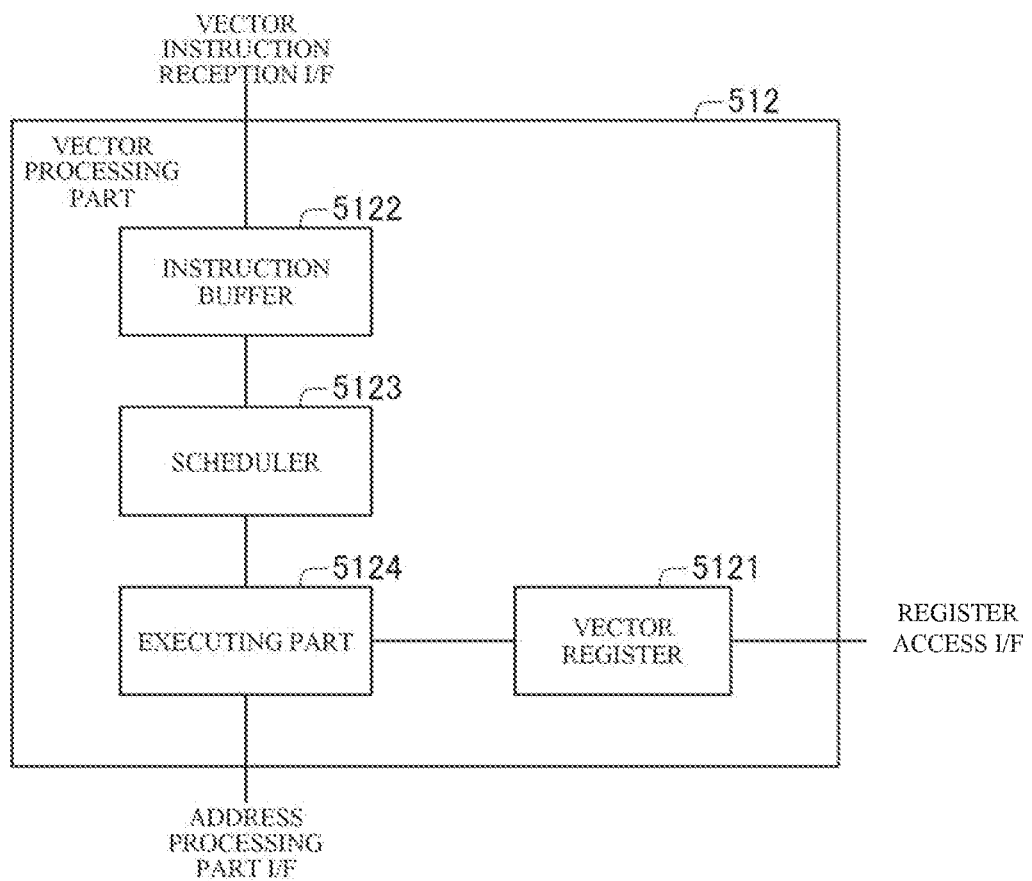
FIG. 6 is a block diagram showing an example of the configuration of a vector processing part shown in FIG. 3.
Figure 7:
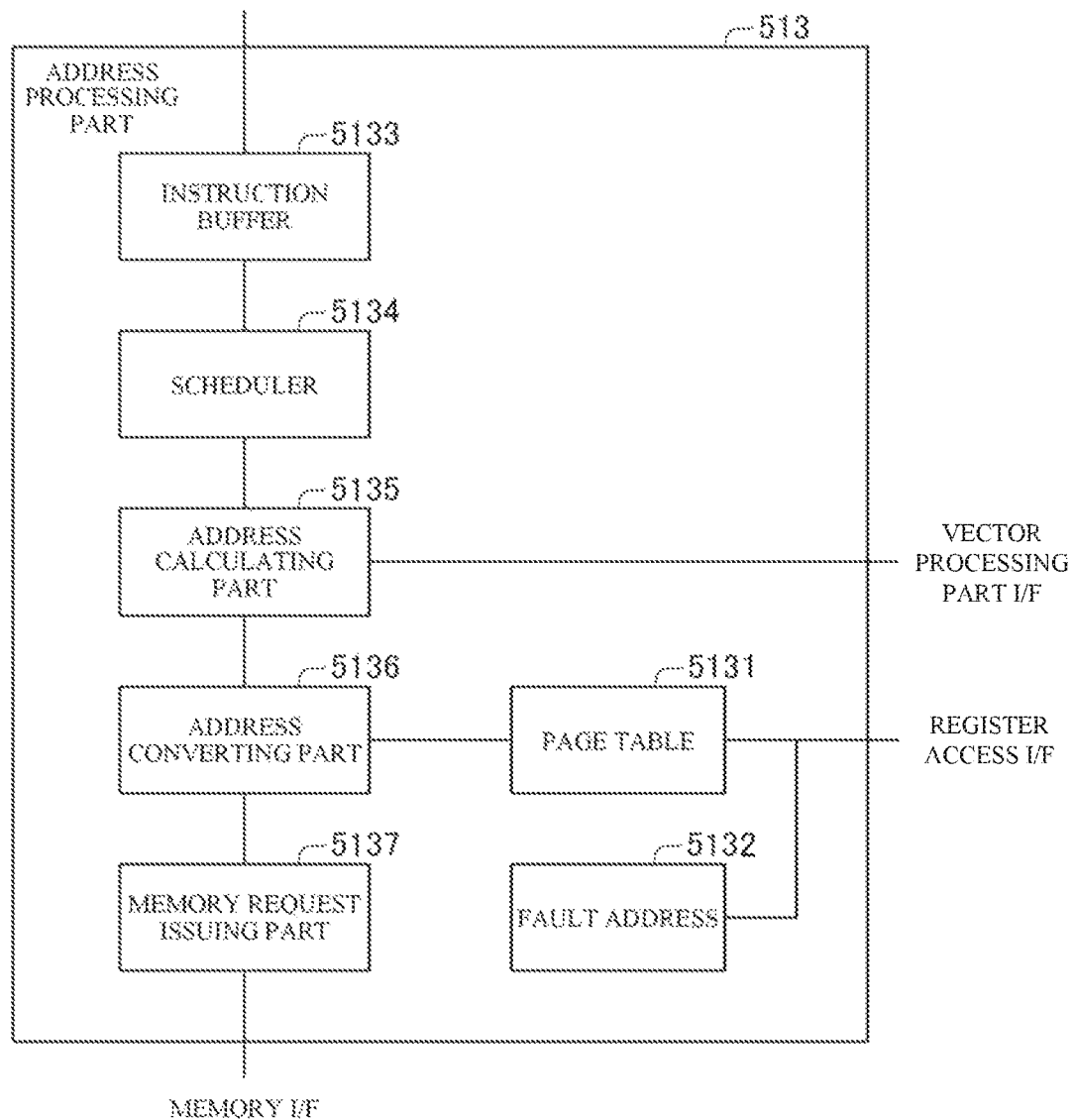
FIG. 7 is a block diagram showing an example of the configuration of an address processing part shown in FIG. 3.
Figure 8:
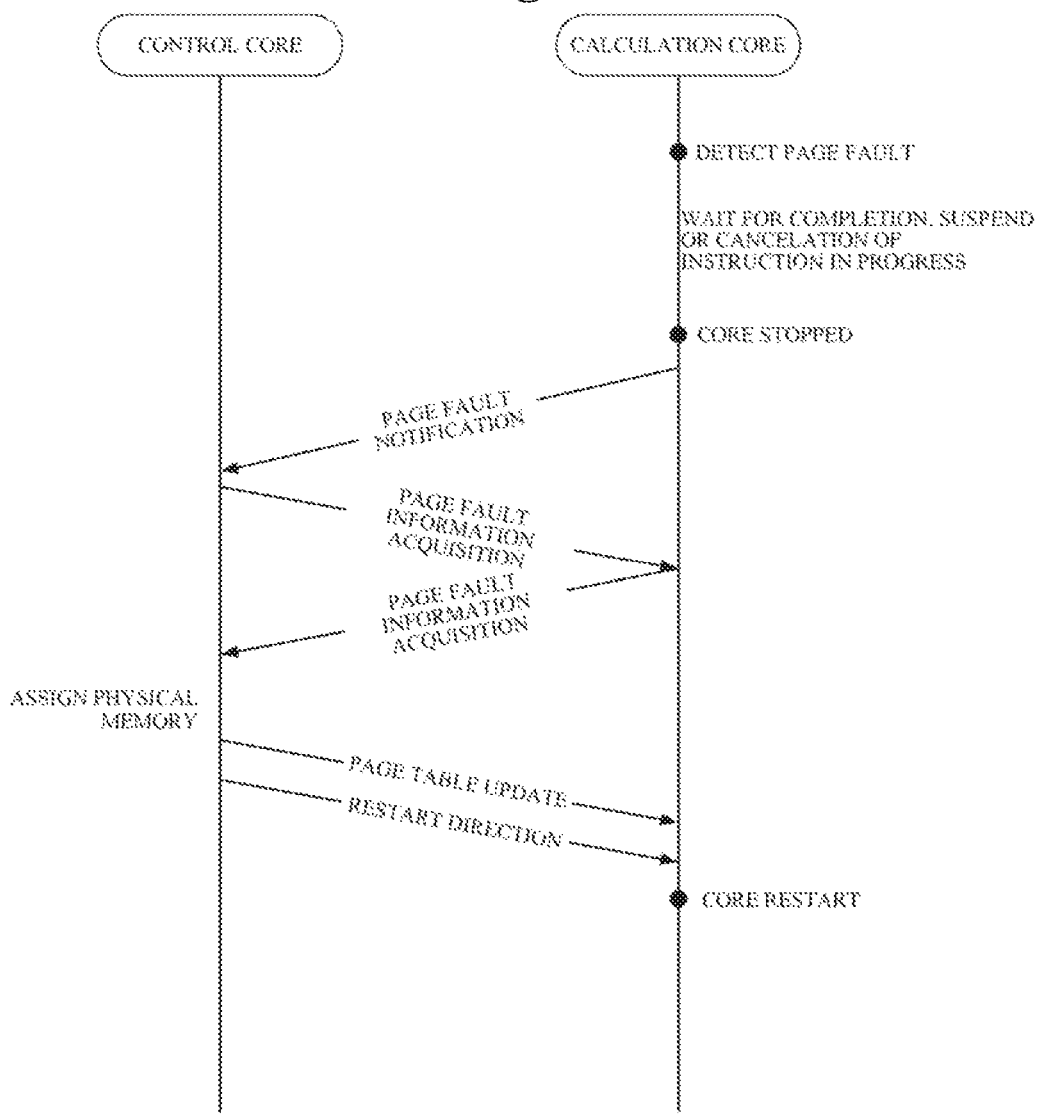
FIG. 8 is a sequence diagram showing an example of the operation of the control core and the calculation core when a page fault is detected in the first example embodiment.

A first example embodiment of the present invention will be described with reference to FIGS. 1 to 8. FIG. 1 is a block diagram showing an example of the configuration of a host server 1. FIG. 2 is a block diagram showing an example of the function of a control core 21. FIG. 3 is a block diagram showing an example of the configuration of a calculation core 51. FIG. 4 is a block diagram showing an example of the configuration of a scalar processing part 511. FIG. 5 is a view for describing a state control register 5111. FIG. 6 is a block diagram showing an example of the configuration of a vector processing part 512. FIG. 7 is a block diagram showing an example of the configuration of an address processing part 513. FIG. 8 is a sequence diagram showing an example of the operation of the control core 21 and the calculation core 51 when a page fault is detected.

In the first example embodiment, the host server 1 having a vector processor 5 executing an application will be described. As will be described later, in this example embodiment, an architecture in which a host processor 2 serving as a control processor providing an OS function and a vector processor 5 actually performing calculation are separated is adopted. Moreover, upon detecting a page fault due to a reason such as an entry corresponding to the logical address of a conversion target does not exist in a page table 5131 or the entry exists but required access authority is not given, the vector processor 5 in this example embodiment suspends or once cancels an instruction in progress in a transient state where the content of a context is not determined. Then, the vector processor 5 notifies the host processor 2 that a page fault has occurred. Moreover, upon receiving the notification, for example, the host processor 2 accesses the vector processor 5 and confirms the address of the access destination having caused the page fault. Then, based on the result of the confirmation, the host processor 2 confirms whether or not an access is permissible and, if permissible, writes information for resolving the page fault into the page table 5131. After that, the host processor 2 directs the vector processor 5 to restart execution of the instruction. Consequently, the vector processor 5 restarts the instruction in a state where the page fault has been resolved.

FIG. 1 shows an example of the configuration of the host server 1 that is an information processing device having an architecture in which the control core 21 as a first processor core and the calculation core 51 as a second processor core are combined. With reference to FIG. 1, the host server 1 has the host processor 2 and a memory 3 mainly used by the host processor 2. Moreover, an expansion card 4 is connected to the host processor 2 through an expansion bus. The expansion card 4 has the vector processor 5 and a memory 6 mainly used by the vector processor 5.

Further, the host processor 2 and the vector processor 5 include cores, respectively. The core included by the host processor 2 runs as the control core 21 that provides the OS function. Moreover, the core included by the vector processor 5 runs as the calculation core 51 that executes an application.

The configuration of the host server 1 is not limited to that shown in FIG. 1. For example, the host server 1 may have a plurality of host processors 2 and a plurality of expansion cards 4. Moreover, one expansion card 4 may include a plurality of calculation cores 51.

Software that provides an operating system function to a program running on the calculation core 51 in the vector processor 5 (this software will be simply referred to as the OS (Operating System) hereinafter) runs in the control core 21 included by the host processor 2. For example, the control core 21 has an arithmetic and logic unit and a storage device, which are not shown in the drawings. For example, the control core 21 realizes the operation of the software providing the operating system function, by execution of a program stored in the storage device (not shown) by the arithmetic device.

The operating system function provided by the control core 21 includes, for example, loading the program, process management such as a context switch, memory management, and providing a system call function. For example, the control core 21 realizes provision of the various functions described above, by reading/writing data from/into various registers included by the calculation core 51 through the expansion bus and a register access I/F (interface) to be described later or from/into the memory 6, and making a direction to start or stop operation to the calculation core 51.

Further, the operating system function provided by the control core 21 includes a function to execute processing for resolving a page fault detected by the calculation core 51. FIG. 2 shows an example of the functions described above. With reference to FIG. 2, the operating system executed by the control core 21 includes, for example, a permissibility judgment part 211, a page table updating part 212 and a directing part 213 as processing parts for realizing the functions described above.

The permissibility judgment part 211 confirms whether or not the cause of an interrupt is a page fault and, in a case where the cause of the interrupt is a page fault, judges whether or not an access that is the cause of the page fault is a permissible one.

For example, when the host processor 2 receives an interrupt signal from the vector processor 5, the permissibility judgment part 211 reads out the values of the state control register 5111 and a fault address 5132, which will be described later, through the expansion bus and the register access I/F shown in FIG. 3. Consequently, the permissibility judgment part 211 acquires page fault information from the calculation core 51.

The permissibility judgment part 211 checks an F field indicating occurrence of a page fault in the state control register 5111. For example, in a case where the F field in the state control register 5111 is 1, the permissibility judgment part 211 acknowledges that the cause of an interrupt is a page fault. On the other hand, in a case where the F field in the state control register 5111 is 0, the permissibility judgment part 211 acknowledges that the cause of the interrupt is not a page fault.

Further, in a case where the cause of an interrupt is a page fault, the permissibility judgment part 211 judges whether or not an access that is the cause of the page fault is a permissible one based on the value of the fault address 5132. For example, in a case where the cause of the page fault is an access to a page where a physical address has not been assigned due to demand paging behavior, the permissibility judgment part 211 judges that it is a permissible access. On the other hand, in a case where the cause of the page fault is an access to an unassigned logical address or the like, the permissibility judgment part 211 judges that it is an impermissible access.

As described above, the permissibility judgment part 211 checks the state control register 5111 and the fault address 5132, thereby confirming whether or not the cause of an interrupt is a page fault and also judging whether or not an access that is the cause of the page fault is a permissible one.

The page table updating part 212 updates the page table 5131 included by the calculation core 51 in a case where the permissibility judgment part 211 judges as a permissible access. For example, the page table updating part 212 updates the page table 5131 so that the page fault is resolved by writing, for example, information of a physical address corresponding to a logical address into the page table 5131.

The directing part 213 directs the calculation core 51 to execute a process corresponding to the result of judgment by the permissibility judgment part 211. For example, in a case where the permissibility judgment part 211 judges as a permissible access, after the page table updating part 212 updates the page table 5131, the directing part 213 sends an execution start direction (a restart direction) to the calculation core 51. Consequently, the calculation core 51 restarts a process having been suspended. On the other hand, in a case where the permissibility judgment part 211 judges as an impermissible access, the directing part 213 directs the calculation core 51 to exit a process being executed by the calculation core 51.

The calculation core 51 executes an application and also sends an interrupt to the host processor 2 as necessary. Moreover, the calculation core 51 is configured to, upon detecting a page fault, be able to stop in a transient state in which the content of a context is not determined. FIG. 3 shows an example of the configuration of the calculation core 51. With reference to FIG. 3, the calculation core 51 has, for example, a scalar processing part 511, a vector processing part 512, and an address processing part 513. The respective processing parts described above can be realized by hardware, for example. Functions executed by the respective processing parts described above, and the like, may be realized by execution of a program stored in a storage device (not shown) by an arithmetic and logic unit.

The scalar processing part 511 has an instruction counter 5112 and a scalar register 5113. The scalar processing part 511 performs fetch of an instruction, decoding, scheduling, and execution of part of the instruction. Moreover, the scalar processing part 511 has an interface for issuing various instructions to the address processing part 513 and the vector processing part 512. Furthermore, the scalar processing part 511 is provided with a state control register 5111 for managing the operation state of the whole calculation core 51.

The vector processing part 512 includes a vector register 5121 that holds vector data. The vector processing part 512 performs various processing such as an operation based on a direction from the scalar processing part 511. Moreover, the vector processing part 512 transmits and receives vector load/store data to and from the address processing part 513 via the interface.

The address processing part 513 has the page table 5131 and the fault address 5132. The address processing part 513 performs address calculation of a vector load/store instruction, address conversion from a virtual address to a physical address, and data transfer between the scalar processing part 511 or the vector processing part 512 and the memory I/F.

Addresses are assigned to the various registers included the scalar processing part 511, the vector processing part 512 and the address processing part 513. To the various registers of the scalar processing part 511, the vector processing part 512, and the address processing part 513, it is possible to read and write via the register access I/F. Moreover, the register access I/F is connected to the expansion bus shown in FIG. 1. Such a configuration enables the host processor 2 to access any of the various registers included by the scalar processing part 511, the vector processing part 512 and the address processing part 513.

Subsequently, examples of the more detailed configurations of the scalar processing part 511, the vector processing part 512 and the address processing part 513 will be described with reference to FIGS. 4 to 7.

First, an example of the detailed configuration of the scalar processing part 511 will be described. FIG. 4 shows an example of the more detailed configuration of the scalar processing part 511. With reference to FIG. 4, the scalar processing part 511 has the state control register 5111, the instruction counter 5112 and the scalar register 5113 that are described above, and also has, for example, a fetch processing part 5114, a decode processing part 5115, a scheduler 5116, and an executing part 5117.

The state control register 5111 is a temporary storage device for managing the operation state of the entire calculation core 51. FIG. 5 shows an example of the state control register 5111. With reference to FIG. 5, the state control register 5111 has a State field indicating the execution status (running, stopped) of the processor and an F field indicating occurrence of a page fault. Thus, the state control register 5111 has information indicating the execution status of the processor, and also has information indicating whether or not a page fault exists. Moreover, the instruction counter 5112 holds an address on the memory 6 where an instruction to be executed next is stored. The instruction counter 5112 is referred to by the fetch processing part 5114. Moreover, in the scalar register 5113, data that needs to be read and written in the course of processing by the executing part 5117.

The fetch processing part 5114 and the decode processing part 5115 fetches and decodes an instruction, respectively. For example, the fetch processing part 5114 refers to the instruction counter 5112 and fetches an instruction to be executed next. Moreover, the decode processing part 5115 interprets an instruction fetched by the fetch processing part 5114, and converts the instruction to an internal instruction of unique format or divides the instruction into a plurality of internal instructions. Then, the decode processing part 5115 passes the decoded result to the scheduler 5116.

The scheduler 5116 interprets dependencies between an issued and uncompleted instruction and an instruction having been decoded by the decode processing part 5115. Then, the scheduler 5116 directs the executing part 5117 to execute an executable instruction while considering the availability of the executing part 5117.

The executing part 5117, based on a direction from the scheduler 5116, performs various operations, issues a memory access instruction to the address processing part 513, and issues a vector instruction to the vector processing part 512, for example. Moreover, the executing part 5117 reads and writes from and to the scalar register 5113 in the course of executing the various processing described above.

Next, an example of the detailed configuration of the vector processing part 512 will be described. FIG. 6 shows an example of the more detailed configuration of the vector processing part 512. With reference to FIG. 6, the vector processing part 512 has the vector register 5121 described above and also has, for example, an instruction buffer 5122, a scheduler 5123 and an executing part 5124.

In the vector register 5121, various data to be read and written by the executing part 5124 in the course of executing various processing are stored.

The instruction buffer 5122 is a buffer that once stores an instruction issued from the scalar processing part 511. Information stored in the instruction buffer 5122 is held until completion of execution of an instruction is guaranteed.

The scheduler 5123 interprets the dependencies of instructions stored in the instruction buffer 5122. Then, the scheduler 5123 directs the executing part 5124 to execute an instruction that is ready for execution while considering the availability of the executing part 5124. As far as there is no dependencies between instructions, the scheduler 5123 can dispatch instructions in out-of-order manner. Moreover, the scheduler 5123 can direct the executing part 5124 and simultaneously delete the corresponding instruction from the instruction buffer 5122.

Based on a direction from the scheduler 5123, the executing part 5124 performs various operations, and issues address information to the address processing part 513, for example. Moreover, the executing part 5124 reads from and writes into the vector register 5121 in the course of executing the various processing described above.

Subsequently, an example of the detailed configuration of the address processing part 513 will be described. FIG. 7 shows an example of the more detailed configuration of the address processing part 513. With reference to FIG. 7, the address processing part 513 has the page table 5131 and the fault address 5132 described above and also has, for example, an instruction buffer 5133, a scheduler 5134, an address calculating part 5135, an address converting part 5136, and a memory request issuing part 5137.

The page table 5131 has a plurality of entries in which a virtual address and a physical address are associated. Information stored in the page table 5131 is referred to by the address converting part 5136, and so on. Moreover, the fault address 5132 is a register that holds an address where a page fault has occurred. When the address converting part 5136 detects a page fault, information indicating the address of an access destination where the page fault has occurred is stored into the fault address 5132 by the address converting part 5136.

The instruction buffer 5133 is a buffer that once stores an instruction issued from the scalar processing part. Information stored in the instruction buffer 5133 is held until completion of execution of the instruction is guaranteed.

The scheduler 5134 interprets the dependencies of the instructions stored in the instruction buffer 5133. Then, the scheduler 5134 instructs the address calculating part 5135 to execute processing of an instruction that is ready for execution while considering the availability of the address calculating part 5135. As far as there are no dependencies between instructions, the scheduler 5134 does not need to instruct execution in order that the instructions have been input. Moreover, the scheduler 5134 can direct the address calculating part 5135 to execute processing and simultaneously delete the corresponding instruction from the instruction buffer 5133.

When necessary, the address calculating part 5135 performs calculation of an address in accordance with a direction from the scheduler 5134. For example, in a case where a direction from the scheduler 5134 is a vector load/store instruction, the address calculating part 5135 calculates an address to actually access from various information accompanying the directed instruction.

For example, in response to the vector load/store instruction, the address calculating part 5135 calculates an address to actually access from a base address, a distance address, a vector length, and so on accompanying the instruction. In a case where the direction from the scheduler 5134 is a scalar load/store instruction, the address of an access destination is already included in the instruction. Therefore, the address calculating part 5135 does not need to particularly perform a new calculation. In a case where the direction from the scheduler 5134 is a vector gather/scatter instruction, the address calculating part 5135 receives the address of an access destination from the vector processing part 512 through the vector processing part I/F.

The address converting part 5136 refers to the page table 5131 and converts the logical address of an access destination requested by the address calculating part 5135 to the physical address.

Further, the address converting part 5136 detects a page fault when performing the above conversion. For example, in a case where an entry corresponding to the logical address of a conversion target does not exist in the page table 5131, or in a case where it is judged that an unauthorized access due to the attribute of an entry is attempted, the address converting part 5136 detects a page fault. Thus, the address converting part 5136 also functions as a page fault detecting means that detects the cause of a page fault, for example, a physical address is unassigned or it is an unauthorized access.

Further, in the case of detecting a page fault, the address converting part 5136 stores the address of an access destination where the page fault has occurred into the fault address 5132. Then, the address converting part 5136 notifies the respective processing parts of the address processing part 513, the scalar processing part 511 and the vector processing part 512 that a page fault has been detected. This notification will be referred to as page fault notification hereinafter.

In a case where address conversion by the address converting part 5136 has succeeded, that is, in a case where a page fault is not detected, the memory request issuing part 5137 formats the physical address of the access destination, routing information up to the access destination, and so on, into the form of a memory access request.

The above is an example of the more detailed configuration of the scalar processing part 511, the vector processing part 512, and the address processing part 513. Next, an example of operation when causing an application program to run in the calculation core 51 having the configuration described above will be described.

First, as the initial state, it is assumed that the value of the State field of the state control register 5111 included by the calculation core 51 in the vector processor 5 indicates "stopped." It is also assumed that the value of the F field is 0.

The user directs the OS running on the control core 21 of the host processor 2 to start execution of an application program. The OS generates an initial value image of each of the registers and an execution image of the memory. Then, the OS writes the generated images into the calculation core 51 in the vector processor 5 and into the memory 6 through the expansion path After that, the OS directs the calculation core 51 to start the execution through writing into a specific address determined in advance. Consequently, the calculation core 51 updates the State field of the state control register 5111 to the value representing "executing" and starts operation.

Next an example of the operation of the calculation core 51 during execution of the application program will be described.

When the calculation core 51 starts operation, the fetch processing part 5114 included by the scalar processing part 511 refers to the instruction counter 5112. Then, the fetch processing part 5114 fetches an instruction to be executed next.

The decode processing part 305 interprets the instruction loaded by the fetch processing part 5114, converts it to an internal instruction of unique form or divides it into a plurality of internal instructions. Then, the decode processing part 305 passes the result to the scheduler 5116.

The scheduler 5116 interprets the dependencies of the internal instructions decoded by the decode processing part 305. Then, the scheduler 5116 directs the executing part 5117 to execute an executable instruction in consideration of the availability of the executing part 5117.

Based on the direction from the scheduler 5116, the executing part 5117 performs various operations, issues a memory access instruction to the address processing part 513, and issues a vector instruction to the vector processing part 512, for example. Moreover, the executing part 5117 reads/writes the scalar register 5113 in the course of executing the above processing.

When the direction issued from the scalar processing part 511 is received in the vector processing part 512, it is stored once into the instruction buffer 5122. The information stored in the instruction buffer 5122 is held until completion of execution of the instruction is guaranteed.

The scheduler 5123 interprets the dependencies between the instructions registered in the instruction buffer 5122. Then, the scheduler 5123 directs the executing part 5124 to execute an executable instruction in consideration of the availability of the executing part 5124. At this time, as far as there are no dependencies between the instructions, the scheduler 5123 does not necessarily need to make an execution direction in order that the instructions have been input. Moreover, simultaneously with the above direction, the scheduler 5123 can delete the corresponding instruction from the instruction buffer 5122.

Based on the direction from the scheduler 5123, the executing part 5124 performs various operations and issues address information to the address processing part, for example. The executing part 5124 reads/writes the vector register 5121 in the course of executing the above processing.

Further, upon receiving the instruction issued from the scalar processing par 511, the address processing part 513 once stores it into the instruction buffer 5133. The information stored in the instruction buffer 5133 is held until completion of execution of the instruction is guaranteed.

The scheduler 5134 interprets the dependencies among the instructions stored in the instruction buffer 5133. Then, the scheduler 5134 directs the address calculating part 5135 to execute processing of an executable instruction in consideration of the availability of the address calculating part 5135. At this time, as far as there are no dependencies among the instructions, the scheduler 5134 does not necessarily need to direct execution in order that the instructions have been input. Moreover, simultaneously with the above direction, the scheduler 5134 can delete the corresponding instruction from the instruction buffer 5133.

In a case where the direction from the scheduler 5134 is a vector load/store instruction, the address calculating part 5135 calculates an address to be actually accessed based on a base address, a distance address, a vector length and so on accompanying the instruction. In a case where the direction from the scheduler 5134 is a scalar load/store instruction, the address of the access destination is already included in the information of the instruction. Therefore, there is no need to calculate in particular. Moreover, in a case where the direction from the scheduler 5134 is a vector gather/scatter instruction, the address calculating part 5135 receives the address of the access destination from the vector processing part 512 through the vector processing part I/F.

The address converting part 5136 refers to the page table 5131. Then, the address converting part 5136 converts the logical address of the access destination obtained by the address calculating part 5135 to a physical address. At this time, in a case where there is no entry corresponding to the logical address of the conversion target in the page table 5131, or in a case where an unauthorized access due to the attribute of an entry is attempted, the address converting part 513 detects a page fault.

In a case where a page fault is not detected and address conversion by the address converting part 5136 succeeds, the memory request issuing part 5137 formats the physical address of the access destination, information of routing up to the access destination, and the like, into a memory access request form.

Next, an example of the operation of the address converting part 5136 when detecting occurrence of a page fault during execution of an application program by the calculation core 51 will be described. This operation will be described with reference to FIG. 8.

As described above, a page fault is detected by the address converting part 5136 included by the address processing part 513 (DETECT PAGE FAULT in FIG. 8). For example, the address converting part 5136 detects a page fault when an entry corresponding to the logical address of a conversion target does not exist in the page table 5131 or when an access which is unauthorized due to the attribute of an entry is attempted.

Upon detecting a page fault, the address converting part 5136 stops operation and saves the address of an access destination where the page fault has occurred into the fault address 5132. Moreover, the address converting part 5136 notifies detection of the page fault to the respective processing parts of the address processing part 513, the scalar processing part 511 and the vector processing part 512. That is, the address converting part 5136 sends page fault notification to the respective processing parts included by the address processing part 513, the scalar processing part 511 and the vector processing part 512. At this time, the address processing part 513 shall keep holding information of the instruction having caused the page fault in a restartable state.

Upon receiving the page fault notification, the instruction buffer 5133 stops issuing a subsequent instruction. Moreover, the scheduler 5134 and the address calculating part 5135 stop operation as well as the address converting part 5136, and keep holding the instruction being processed and various control information in a restartable state. After stoppage of all the processing parts included by the address processing part 513 is confirmed, the address processing part 513 sends stoppage notification to the scalar processing part 511. There is a possibility that address information is kept input by the vector processing part I/F even after the stoppage. This information is held in the address calculating part 5135 so that the information can be used when the processing is restarted.

Upon receiving the page fault notification, the vector processing part 512 stops new issue of an instruction from the instruction buffer 5122 and the scheduler 5123. After that, the vector processing part 512 waits for completion of processing of all the instructions being executed by the executing part 5124. Then, after processing of all the instructions being executed by the executing part 5124 are completed, the vector processing part 512 sends stoppage notification to the scalar processing part 511.

Upon receiving the page fault notification, the scalar processing part 511 stops new issue of an instruction from the fetch processing part 5114, the decode processing part 5115 and the scheduler 5116. Moreover, the scalar processing part 511 sets the value of the F field of the state control register 5111 to 1. After that, the scalar processing part 511 waits for completion of processing of all the instructions being executed by the executing part 5117.

As the stoppage notifications from the address processing part 513 and the vector processing part 512 are received and processing of all the instructions being executed by the executing part 5117 is completed, the scalar processing part 511 confirms that all the components in the calculation core 51 stop. The scalar processing part 511 changes the value of the State field of the state control register 5111 to the value representing "stopped." Then, the scalar processing part 511 sends out an interrupt signal to the host processor 2. That is, after confirming CORE STOPPED shown in FIG. 8 (the respective components included by the calculation core 51 stop), the scalar processing part 511 sends page fault notification to the control core 21 of the host processor 2.

In the stopped state, the calculation core 51 stops, and an issued and uncompleted instruction is left in the transient state. That is, the value of a context is not defined.

Further, as described above, it does not need to be immediate after detection of a page fault that the calculation core 51 stops. The calculation core 51 can stop, for example, after waiting for completion of execution of a partly issued instruction or arrival of a reply from the memory or the like, or after executing a process such as saving information necessary for restart.

When the host processor 2 receives the interrupt signal, the permissibility judgment part 211 of the OS running in the host processor 2 reads out the values of the state control register 5111 and the fault address 5132 through the expansion bus and the register access I/F. That is, the permissibility judgment part 211 of the control core 21 executes a PAGE FAULT INFORMATION ACQUISITION process shown in FIG. 8.

The permissibility judgment part 211 of the OS acknowledges that the cause of the interrupt is the page fault as the F field of the state control register 5111 is 1. Subsequently, the permissibility judgment part 211 judges whether or not an access to the address acquired from the fault address 5132 is permitted.

In a case where the cause of the page fault is a permissible one, for example, an access to a page where a physical address has not been assigned due to demand paging behavior, the permissibility judgment part 211 judges as a permissible access. In this case, the page table updating part 212 writes appropriate information into the page table 5131 so that the page fault is resolved. That is, the page table updating part 212 executes a PAGE TABLE UPDATE process shown in FIG. 8. After that, the directing part 213 of the OS directs the calculation core 51 to start execution (a RESTART DIRECTION in FIG. 8).

On the other hand, in a case where the cause of the page fault is not a permissible one, for example, an access to an unassigned logical address, the permissibility judgment part 211 judges as an impermissible access. In this case, the directing part 213 directs the calculation core 51 to exit a process being executed by the calculation core 51.

Upon receiving the execution start direction, the calculation core 51 sets the value of the F field of the state control register 5111 to 0 and also updates the State field to a value representing "executing." Then, the calculation core 51 restarts operation. At the time of restarting operation, the scalar processing part 511, the vector processing part 512, and the respective processing parts having stopped in the address processing part 513 restart operation based on information held thereby. Moreover, the scalar processing part 511, the vector processing part 512, and the processing parts having stopped new issue of instructions in the address processing part 513 restart new issue of instructions.

The above is an example of the operation when the address converting part 5136 detects occurrence of a page fault during execution of an application program by the calculation core 51.

As described above, the host server 1 according to this example embodiment employs an architecture in which the control core 21 and the calculation core 51 are separated. Moreover, the calculation core 51 is configured to, when detecting a page fault, be able to stop in a transient state that an issued and uncompleted instruction is left and the content of a context is not defined. Moreover, the control core 21 includes the permissibility judgment part 211, the page table updating part 212, and the directing part 213. With such a configuration, when it is determined that a page fault has occurred due to a permissible access as a result of the judgment by the permissibility judgment part 211, the page table updating part 212 updates the page table 5131 of the calculation core 51 and thereafter the directing part 213 can issue an execution start direction. As a result, the calculation core 51 can restart execution of the suspended application without inconsistency. That is, according to the above configuration, it is possible to realize a restartable page fault even for a processor such as the vector processor 5, which has been conventionally hard to implement a restartable page fault.

Further, according to the method described in this example embodiment, it is possible to implement a restartable page fault, so that it is possible to implement, for example, demand paging and page swapping for an active process that have been hard to implement on a processor on which a restartable page fault is not implemented. This makes it possible to efficiently use a physical memory. Moreover, it is possible to eliminate the need for processing for preventing occurrence of a page fault, which has been needed conventionally, such as previously allocating the physical memory to all the assigned virtual addresses at the time of securing memory, copying all the allocated writable areas when forking a process, previously checking whether memory of the stack area can be used at the time of calling all functions. As a result, the execution performance of the processor can be improved.

In this example embodiment, a case where a restartable page fault is implemented on the vector processor 5 is shown as an example. However, the present invention can be applied without being limited to the vector processor 5. The present invention can be applied to various processors having an architecture in which a restartable page fault has been hard to implement conventionally. A processor which has been hard to implement a restartable page fault as described above is, for example, a processor having a feature such that a register size defined in the architecture is large and an instruction (for example, a gather instruction, a scatter instruction) to access a plurality of addresses stored in a register by indirect reference is performed.

Further, in this example embodiment, it is assumed that when a page fault is detected, the scheduler 5134, the address calculating part 5135 and the address converting part 5136 included by the address processing part 513 stop their operations and keep holding instructions being processed and various control information in a restartable state. However, the scheduler 5134, the address calculating part 5135 and the address converting part 5136 may be configured to once cancel the processing of an instruction being processed and thereafter reissue the uncompleted instruction from the instruction buffer 5133 at the time of restart, thereby restarting the instruction. In this case, the calculation core is configured to delete the instruction from the instruction buffer 5133, not on a stage that the instruction is issued by the scheduler 5134, but on a stage that conversion of all addresses relating to the instruction is completed by the address converting part 5136 and it is confirmed no page fault occurs at all the addresses.

Further, the calculation core 51 may have a function of being capable of storing information for identifying an issued portion and an unissued portion of an instruction and refer to the information at the time of restart. With the above configuration, in a case where an instruction having caused a page fault is a vector instruction causing accesses to a plurality of addresses and some of the accesses have already been issued to the memory request issuing part 5137, the calculation core 51 can operate not to issue the already issued accesses again at the time of restart of operation. The function as described above can be implemented by, for example, configuring the address calculating part 5135 and the address converting part 5136 to process vector instructions in order of vector element numbers and causing the address processing part 513 to store the element numbers of the issued ones.

Second Example Embodiment

Figure 9:
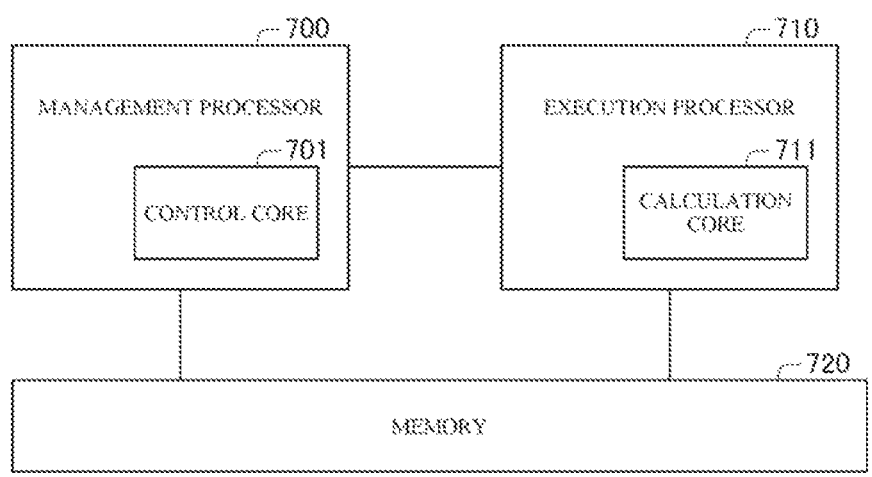
FIG. 9 is a block diagram showing an example of the configuration of an information processing device according to a second example embodiment of the present invention.

Next, with reference to FIG. 9, a second example embodiment of the present invention will be described. FIG. 9 is a block diagram showing an example of the configuration of an information processing device according to the second example embodiment of the present invention.

With reference to FIG. 9, the information processing device has a management processor 700 as a control core 701 and an execution processor 710 as a calculation core 711, instead of the configuration including the host processor 2 and the vector processor 5 described in the first example embodiment. The management processor 700 as the control core 701 and the execution processor 710 as the calculation core 711 are placed, for example, in the same LSI, LSI package, or board.

By placing the control core 701 and the calculation core 711 close to each other and connecting the control core 701 and the calculation core 711 by using a broadband interface with shorter latency than the expansion bus as in the information processing device described in this example embodiment, it is possible to save time for communication between the cores and enhance the effective performance of an application executed by the calculation core 711.

In FIG. 9, a memory 720 is connected to the management processor 700 and the execution processor 710 and shared by both the processors. However, both the processors may share the memory 720 or may include dedicated memories which are independent of each other.

Third Example Embodiment

Figure 10:
FIG. 10 is a view for describing a state control register according to a third example embodiment of the present invention.
Figure 11:
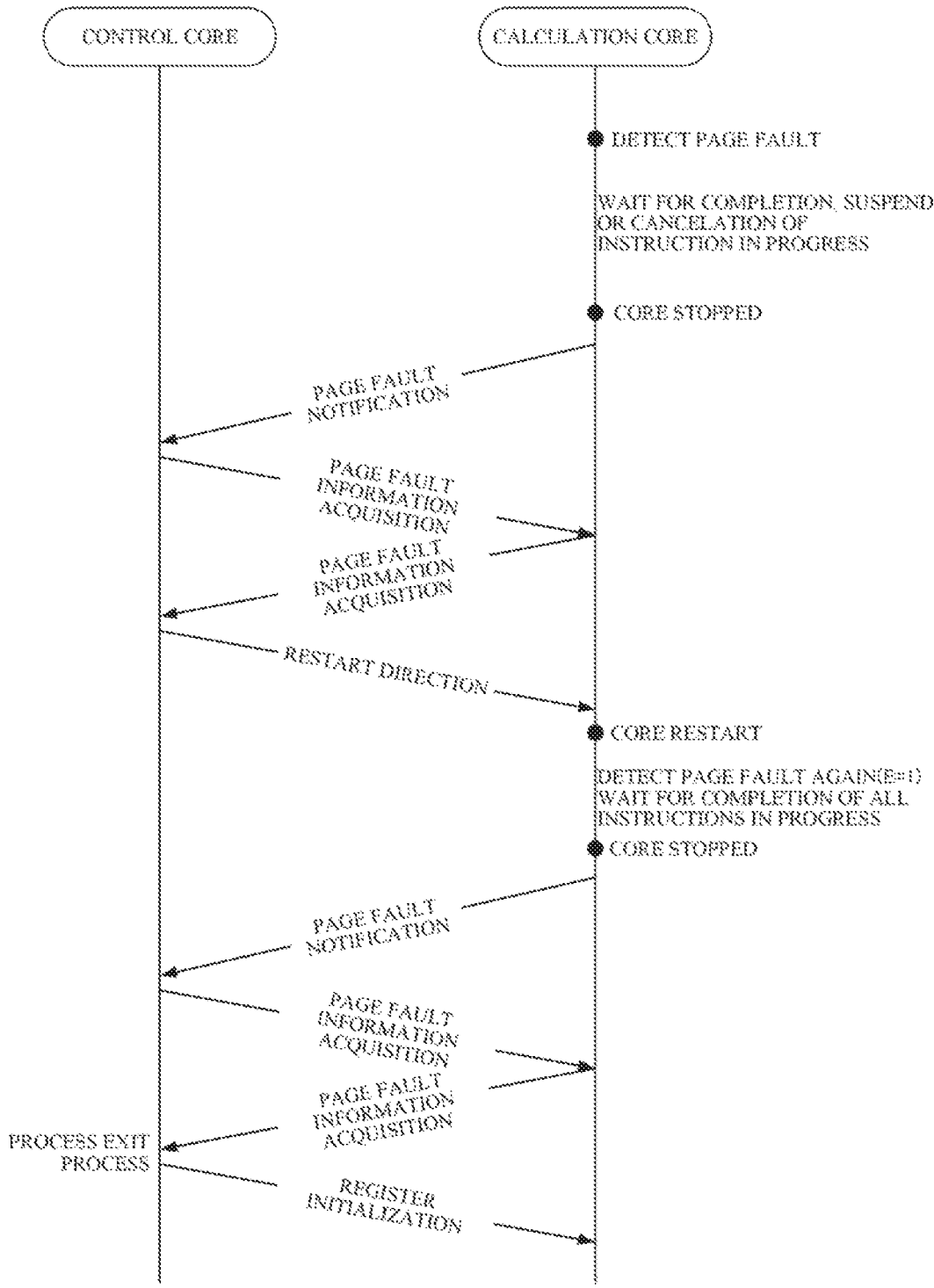
FIG. 11 is a sequence diagram showing an example of the operation of the control core and the calculation core when a page fault is detected in a third example embodiment.

Next, with reference to FIGS. 10 and 11, a third example embodiment of the present invention will be described. FIG. 10 is a view for describing the state control register 5111 according to the third example embodiment. FIG. 11 is a sequence diagram showing an example of operation of the control core 21 and the calculation core 51 when a page fault is detected.

In the third example embodiment, a configuration in which an E field is added to the state control register 5111 described in the first example embodiment will be described. As shown in FIG. 10, in the state control register 5111 in this example embodiment, an E field is added to the configuration described in the first example embodiment.

The value of the E field represents whether or not to permit stoppage of the calculation core 51 in a state where in which an issued and uncompleted instruction exists at the time of occurrence of a page fault and the value of a context is not defined. For example, in a case where the value of the E field is 0, it is permitted that the core stops in a state where the value of the context is not defined. Therefore, when a page fault occurs in a state where the value of the E field is 0, as described in the first example embodiment, the calculation core 51 stops in a state of leaving the issued and uncompleted instruction and holding information necessary to restart. On the other hand, in a case where the value of the E field is 1, it is not permitted that the core stops in a state that the value of the context is not defined. Therefore, when a page fault occurs in such a state, the decode processing part 5115 included by the scalar processing part 511 stops issuing a new instruction and the other components keep their operations. Then, the calculation core 51 stops after executing all the issued instructions is completed. Thus, by providing the state control register 5111 with the E field, it is possible to cause the calculation core 51 to stop after execution of all the issued instructions is completed.

Thus, by providing the state control register 5111 with the E field, it is possible to solve the following problem that occurs in the first example embodiment. In the first example embodiment, in a case where a page fault occurs and its cause is an impermissible one such as an access to an unassigned logical address, a process being executed by the calculation core 51 is exited. However, at a time when the process is exited, information of an issued and uncompleted instruction for restarting the instruction is left in the instruction buffer 5122 of the vector processing part 512, the instruction buffer 5133 of the address processing part 513, and so on. Leaving the information of the issued and uncompleted instruction may cause an unintended exception, memory access or the like at the time of causing the calculation core 51 to execute a new process. Therefore, in the first example embodiment, there is a need to erase the information of the issued and uncompleted instruction left in the vector processing part 512 and the address processing part 513 by any method.

On the other hand, in this example embodiment, the state control register 5111 is provided with the E field, so that it is possible by setting the E fled to 1 as necessary, to erase the information of the issued and uncompleted instruction by a simple method.

The above-described processing will be described in more detail with reference to FIG. 11. FIG. 11 is a sequence diagram showing an example of operation when a page fault that cannot be permitted occurs. In this sequence, the E field shall be set to 0 in the initial state.

With reference to FIG. 11, after detecting a page fault, the calculation core 51 notifies by interrupt, and the control core 21 acquires information relating to the page fault from the calculation core 51. The flow until here is the same as in the first example embodiment described with reference to FIG. 8.

After that, it is assumed that the permissibility judgment part 211 of the OS included by the control core 21 judges that the cause of the page fault is an impermissible one. The directing part 213 of the OS directs setting 1 in the E field, and also issues an execution start direction to the calculation core 51. That is, the directing part 213 makes a restart direction shown in FIG. 11.

Upon receiving the execution start direction, the calculation core 51 sets the value of the F field of the state control register 5111 to 0, and also updates the State field to the value representing "executing." Then, the calculation core 51 restarts operation. However, in the case shown in FIG. 11, the page table update process has not been done, and the page fault has not been resolved. Therefore, the calculation core 51 detects a page fault again at the same address.

When a page fault is detected again, the value of the E field is 1. Therefore, the calculation core 51 completes all the issued instructions and thereafter stops. Consequently, in the respective components of the calculation core 51, information relating to the uncompleted instruction is not left.

Thus, in this example embodiment, the state control register 5111 is provided with the E field. Moreover, eh control core 21 is configured to, in a case where the permissibility judgment part 211 judges that the cause of a page fault is not permitted, set the value of the E field to 1 and then makes an execution start direction without updating the page table 5131. With such a configuration, in a case where the cause of the page fault is not permitted, it is possible to cause the calculation core 51 to operate so as to stop after completing all the issued instructions. Consequently, it is possible to delete information relating to an uncompleted instruction in the calculation core 51 by a simple method.

The configuration described in this example embodiment may be included by the configuration described in the second example embodiment.

Fourth Example Embodiment

Next, with reference to FIG. 12, a fourth example embodiment of the present invention will be described. In the second example embodiment, the outline of the configuration of an information processing device 8 will be described.

Figure 12:
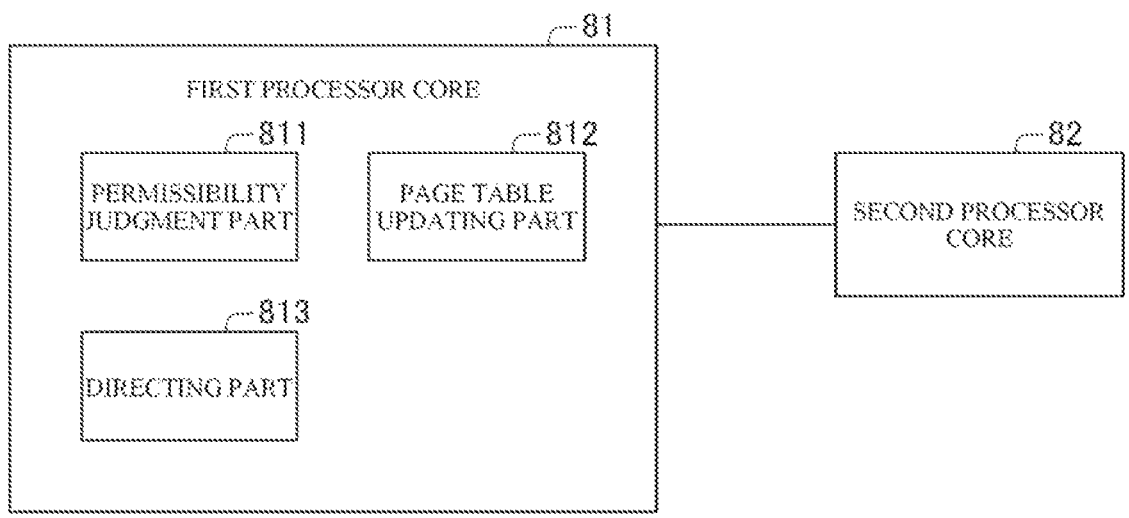
FIG. 12 is a block diagram showing an example of the configuration of a first processor core and a second processor core according to a fourth example embodiment.

With reference to FIG. 12, the information processing device 8 includes a first processor core 81 and a second processor core 82. As shown in FIG. 12, the first processor core 81 and the second processor core 82 are connected so as to be able to communicate with each other.

The second processor core 82 is controlled by the first processor core 81 to execute an application. Upon detecting a page fault, the second processor core 82 stops new issue of an instruction. Moreover, the second processor core 82 stops while being able to restart an issued and uncompleted instruction. Then, the second processor core 82 sends notification of detection of a page fault to the first processor core.

The first processor core 81 includes an operating system built therein to control the second processor core 82. With reference to FIG. 12, the first processor core 81 includes, for example, a permissibility judgment part 811, a page table updating part 812, and a directing part 813. The first processor core 81 has, for example, an arithmetic device and a storage device, which are not shown in the drawings. For example, the first processor core 81 realizes the respective processing parts described above by execution of a program stored in the storage device by the arithmetic device.

In response to reception of the notification from the second processor core 82, the permissibility judgment part 811 judges whether or not the page fault is admissible.

In accordance with the result of the judgment by the permissibility judgment part 811, the page table updating part 812 updates the page table in the second processor core.

The directing part 813 sends a direction corresponding to the result of the judgment by the permissibility judgment part 811 to the second processor core 82.

Thus, the second processor core 82 in this example embodiment is configured to, upon detecting a page fault, stop new issue of an instruction, stop while being able to restart an issued and uncompleted instruction, and send notification of detection of the page fault to the first processor core 81. Moreover, the first processor core 81 has the permissibility judgment part 811, the page table updating part 812, and the directing part 813. With such a configuration, the page table updating part 812 can update the page table included by the second processor core 82 in accordance with the result of the judgment by the permissibility judgment part 811. Moreover, the directing part 813 can send a direction appropriate for the result of the judgment by the permissibility judgment part 811 to the second processor core 82. Consequently, the second processor core 82 can restart execution of the suspended application. That is, according to the above-described configuration, it is possible to realize a restartable page fault in the second processor core 82.

Further, the information processing device 8 can be realized by installation of a predetermined program in the information processing device 8. To be specific, a program as another aspect of the present invention is a program comprising instructions for, in an information processing device having a first processor core in which an operating system is installed and a second processor core controlled by the first processor core and capable of executing parallel operation processing: causing the second processor core to realize a process of, when detecting the page fault, stopping new issue of an instruction and stop in a state where an issued and uncompleted instruction can be restarted, and also sending notification that the page fault is detected to the first processor core; and causing the first processor core to realize: a permissibility judgment part configured to, in response to reception of the notification, judge whether or not the page fault is permissible, a page table updating part configured to update a page table included by the second processor core in accordance with a result of the judgment by the permissibility judgment part, and an directing part configured to send a direction corresponding to a result of the judgment by the permissibility judgment part to the second processor core.

Further, an information processing method executed by the information processing device is an information processing method executed by an information processing device having a first processor core in which an operating system is installed and a second processor core controlled by the first processor core and capable of executing parallel operation processing. The information processing method includes: by the second processor core, when detecting the page fault, stopping new issue of an instruction and stops in a state where an issued and uncompleted instruction can be restarted, and also sending notification that the page fault has been detected to the first processor core; and by the first processor core: judging whether or not the page fault is permissible in response to reception of the notification; updating a page table included by the second processor core in accordance with a result of the judgment; and sending a direction corresponding to a result of the judgment to the second processor core.

The invention of the program or the information processing method having the above-described configuration can also achieve the above-described object of the present invention because the invention has the same action as the information processing device 8.

<Supplementary Notes>

The whole or part of the example embodiments disclosed above can be described as the following supplementary notes. Below, the outline of the information processing device and so on of the present invention will be described. However, the present invention is not limited to the following configurations.

(Supplementary Note 1)

An information processing device comprising a first processor core in which an operating system is installed and a second processor core controlled by the first processor core and capable of executing parallel operation processing, wherein:

the second processor core is configured to, when detecting a page fault, stop new issue of an instruction and stop in a state where an issued and uncompleted instruction can be restarted, and also send notification that the page fault has been detected to the first processor core; and the first processor core includes:
  a permissibility judgment part configured to judge whether or not the page fault is permissible in response to reception of the notification;
  a page table updating part configured to update a page table included by the second processor core in accordance with a result of the judgment by the permissibility judgment part; and
  a directing part configured to send a direction corresponding to a result of the judgment by the permissibility judgment part to the second processor core.

(Supplementary Note 2)

The information processing device according to Supplementary Note 1, wherein:

the second processor core stores an address where the page fault has occurred; and the permissibility judgment part included by the first processor core is configured to judge whether or not the page fault is permissible with reference to the address where the page fault has occurred stored by the second processor core.

(Supplementary Note 3)

The information processing device according to Supplementary Note 1 or 2, wherein:

the second processor core stores information representing presence/absence of occurrence of the page fault; and the permissibility judgment part included by the first processor core is configured to, in a case of acknowledging that the page fault has occurred based on the information representing presence/absence of occurrence of the page fault stored by the second processor core, judge whether or not the page fault is permissible.

(Supplementary Note 4)

The information processing device according to any one of Supplementary Note 1 to 3, wherein the second processor core is configured to restart the issued and uncompleted instruction in response to a restart direction from the directing part.

(Supplementary Note 5)

The information processing device according to any one of Supplementary Notes 1 to 4, wherein the second processor core includes an instruction buffer that temporarily stores an instruction, and is configured to, in response to a restart direction from the directing part, reissue the uncompleted instruction from the instruction buffer and restart execution of the instruction.

(Supplementary Note 6)

The information processing device according to any one of Supplementary Notes 1 to 5, wherein the second processor core stores information that distinguishes an issued portion and an unissued portion of an instruction, and is configured not to reissue an issued access when restarting execution of the instruction.

(Supplementary Note 7)

The information processing device according to any one of Supplementary Notes 1 to 6, wherein the second processor core stores stoppage state information that is information representing whether or not to stop while leaving the issued and uncompleted instruction, and is configured to stop based on the stoppage state information when detecting the page fault.

(Supplementary Note 8)

The information processing device according to Supplementary Note 7, wherein the first processor core is configured to, when the permissibility judgment part judges that the page fault is not permissible, change the stoppage state information so as to represent not stopping while leaving the issued and uncompleted instruction, and also cause the directing part to make a restart direction without update by the page table updating part.

(Supplementary Note 9)

An information processing method executed by an information processing device comprising a first processor core in which an operating system is installed and a second processor core controlled by the first processor core and capable of executing parallel operation processing, the information processing method comprising:

by the second processor core, when detecting the page fault, stopping new issue of an instruction and stopping in a state where an issued and uncompleted instruction can be restarted, and also sending notification that the page fault has been detected to the first processor core; and by the first processor core:
- judging whether or not the page fault is permissible in response to reception of the notification;
- updating a page table included by the second processor core in accordance with a result of the judgment; and
- sending a direction corresponding to a result of the judgment to the second processor core.

(Supplementary Note 10)

A non-transitory computer-readable medium storing a program comprising instructions for, in an information processing device comprising a first processor core in which an operating system is installed and a second processor core controlled by the first processor core and capable of executing parallel operation processing:

causing the second processor core to realize a process of, when detecting the page fault, stopping new issue of an instruction and stopping in a state where an issued and uncompleted instruction can be restarted, and also sending notification that the page fault is detected to the first processor core; and causing the first processor core to realize:
- a permissibility judgment part configured to, in response to reception of the notification, judge whether or not the page fault is permissible;
- a page table updating part configured to update a page table included by the second processor core in accordance with a result of the judgment by the permissibility judgment part; and
- a directing part configured to send a direction corresponding to a result of the judgment by the permissibility judgment part to the second processor core.

The program described in the example embodiments and supplementary notes is stored in a storage device or recorded on a computer-readable recording medium. For example, the recording medium is a portable medium such as a flexible disk, an optical disk, a magneto-optical disk, and a semiconductor memory.

Although the present invention has been described above with reference to the example embodiments, the present invention is not limited to the example embodiments described above. The configurations and details of the present invention can be changed in various manners that can be understood by one skilled in the art.

EXPLANATION OF REFERENCE NUMERALS 1 host server
2 host processor
21 control core
211 permissibility judgment part
212 page table updating part
213 directing part
3 memory
4 expansion card
5 vector processor
51 calculation core
511 scalar processing part
5111 state control register
5112 instruction counter
5113 scalar register
5114 fetch processing part
5115 decode processing part
5116 scheduler
5117 executing part
512 vector processing part
5121 vector register
5122 instruction buffer
5123 scheduler
5124 executing part
513 address processing part
5131 page table
5132 fault address
5133 instruction buffer
5134 scheduler
5135 address calculating part
5136 address converting part
5137 memory request issuing part
6 memory
700 management processor
701 control core
710 execution processor
720 memory
8 information processing device
81 first processor core
811 permissibility judgment part
812 page table updating part
813 directing part
82 second processor core

The invention claimed is:

1. An information processing device comprising a control core that is a first processor core in which an operating system is installed and a calculation core that is a second processor core controlled by the control core and capable of executing parallel operation processing, wherein:

the calculation core is configured to, when detecting a page fault, stop new issue of an instruction and stop in a state where an issued and uncompleted instruction can be restarted, and also send notification that the page fault has been detected to the control core; and the control core provides a program operable on the calculation core with an operating system function, and includes:
- a permissibility judgment part configured to check occurrence of a page fault by reading a value of a register included in the calculation core that is an external device, and judge whether or not the page fault is permissible in response to reception of the notification;
- a page table updating part configured to update a page table included in the calculation core during stoppage of the calculation core in accordance with a result of the judgment by the permissibility judgment part; and a directing part configured to send a direction corresponding to a result of the judgment by the permissibility judgment part to the calculation core;

when the permissibility judgment part judges as permissible, the directing part sends a restart direction to the calculation core, and the calculation core restarts operation in accordance with the restart direction; and when the permissibility judgment part judges as impermissible, the directing part directs the calculation core to exit a process being executed.

2. The information processing device according to claim 1, wherein:

the calculation core stores an address where the page fault has occurred; and the permissibility judgment part included by the control core is configured to judge whether or not the page fault is permissible with reference to the address where the page fault has occurred stored by the calculation core.

3. The information processing device according to claim 1, wherein:

the calculation core stores information representing presence/absence of occurrence of the page fault; and the permissibility judgment part included by the control core is configured to, in a case of acknowledging that the page fault has occurred based on the information representing presence/absence of occurrence of the page fault stored by the calculation core, judge whether or not the page fault is permissible.

4. The information processing device according to claim 1, wherein the calculation core is configured to restart the issued and uncompleted instruction in response to the restart direction from the directing part.

5. The information processing device according to claim 1, wherein the calculation core includes an instruction buffer that temporarily stores an instruction, and is configured to, in response to the restart direction from the directing part, reissue the uncompleted instruction from the instruction buffer and restart execution of the instruction.

6. The information processing device according to claim 1, wherein the calculation core stores information that distinguishes an issued portion and an unissued portion of an instruction, and is configured not to reissue an issued access when restarting execution of the instruction.

7. The information processing device according to claim 1, wherein the calculation core stores stoppage state information that is information representing whether or not to stop while leaving the issued and uncompleted instruction, and is configured to stop based on the stoppage state information when detecting the page fault.

8. The information processing device according to claim 7, wherein the control core is configured to, when the permissibility judgment part judges that the page fault is not permissible, change the stoppage state information so as to represent not stopping while leaving the issued and uncompleted instruction, and also cause the directing part to make the restart direction without update by the page table updating part.

9. An information processing method executed by an information processing device comprising a control core that is a first processor core in which an operating system is installed and a calculation core that is a second processor core controlled by the control core and capable of executing parallel operation processing, the information processing method comprising:

by the calculating core, when detecting the page fault, stopping new issue of an instruction and stopping in a state where an issued and uncompleted instruction can be restarted, and also sending notification that the page fault has been detected to the control core; and by the control core:

providing a program operable on the calculation core with an operating system function;

checking occurrence of a page fault by reading a value of a register included in the calculation core that is an external device;

judging whether or not the page fault is permissible in response to reception of the notification;

updating a page table included in the calculation core during stoppage of the calculation core in accordance with a result of the judgment; and sending a direction corresponding to a result of the judgment to the calculation core, wherein when the permissibility judgment part judges as permissible, the directing part sends a restart direction to the calculation core, and the calculation core restarts operation in accordance with the restart direction, and when the permissibility judgment part judges as impermissible, the directing part directs the calculation core to exit a process being executed.

10. A non-transitory computer-readable medium storing a program comprising instructions for, in an information processing device comprising a control core that is a first processor core in which an operating system is installed and a calculation core that is a second processor core controlled by the control core and capable of executing parallel operation processing:

causing the calculating core to realize a process of, when detecting the page fault, stopping new issue of an instruction and stopping in a state where an issued and uncompleted instruction can be restarted, and also sending notification that the page fault is detected to the control core; and causing the control core to provide the calculation core with an operating system function and to realize:

a permissibility judgment part configured to check occurrence of a page fault by reading a value of a register included in the calculation core that is an external device, and, in response to reception of the notification, judge whether or not the page fault is permissible;

a page table updating part configured to update a page table included in the calculation core during stoppage of the calculation core in accordance with a result of the judgment by the permissibility judgment part; and a directing part configured to send a direction corresponding to a result of the judgment by the permissibility judgment part to the calculation core, wherein when the permissibility judgment part judges as permissible, the directing part sends a restart direction to the calculation core, and the calculation core restarts operation in accordance with the restart direction; and when the permissibility judgment part judges as impermissible, the directing part directs the calculation core to exit a process being executed.

* * * * *